L. ANDREWS.
COMBINED RECEPTACLE AND MEASURING DEVICE.
APPLICATION FILED MAR. 16, 1911.
1,005,130.
Patented Oct. 10, 1911.
4 SHEETS—SHEET 1.
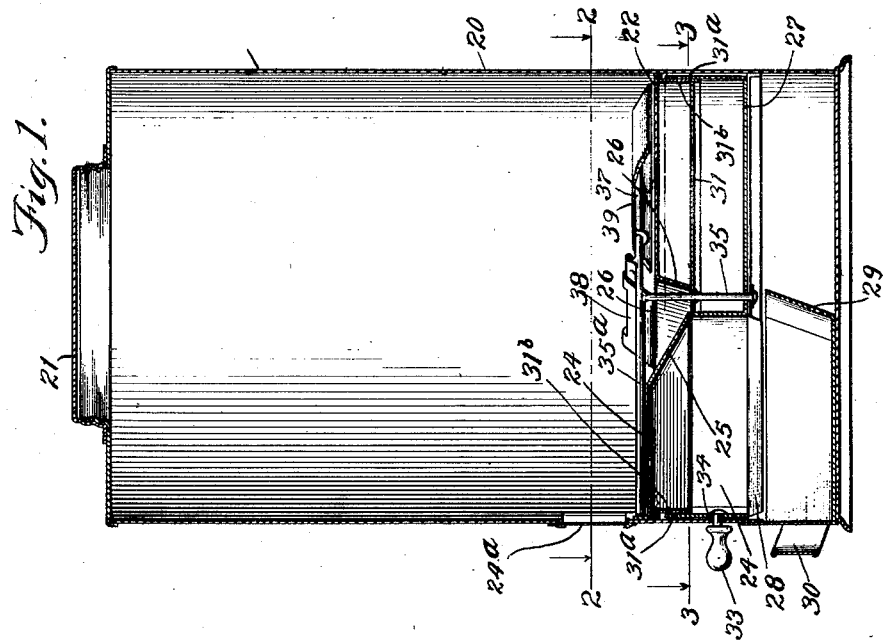
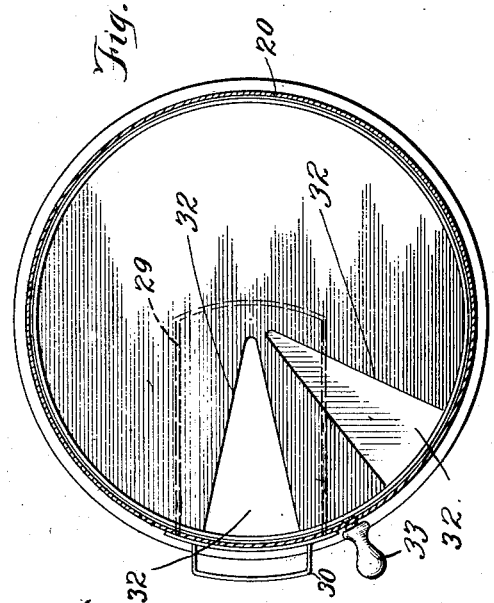
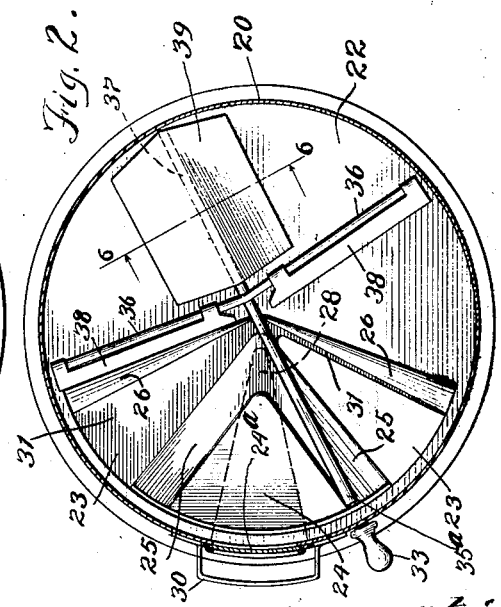

L. ANDREWS.
COMBINED RECEPTACLE AND MEASURING DEVICE.
APPLICATION FILED MAR. 16, 1911.
1,005,130.
Patented Oct. 10, 1911.
4 SHEETS—SHEET 2.
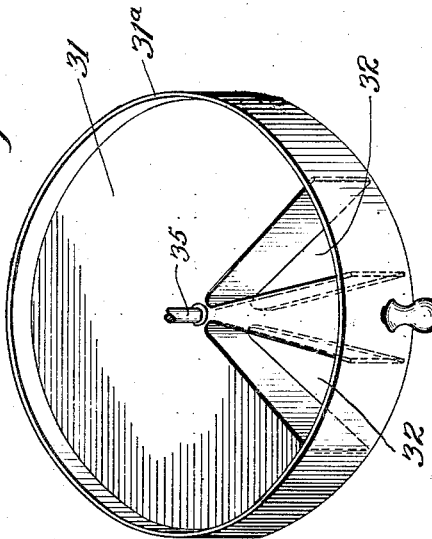
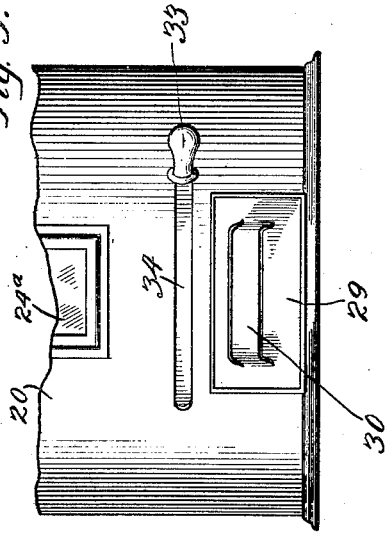
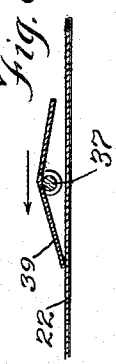
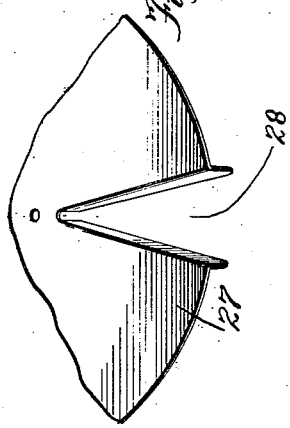
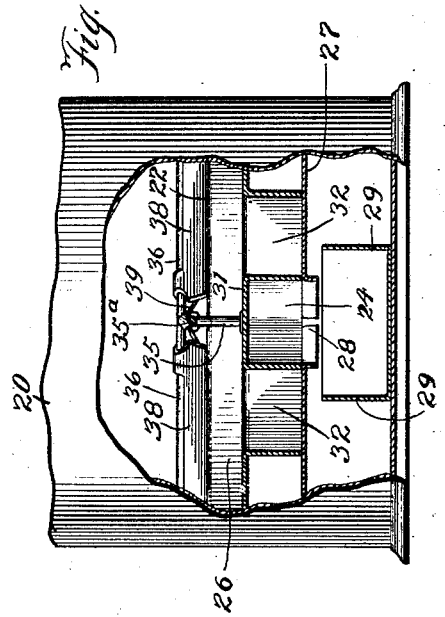

L. ANDREWS.
COMBINED RECEPTACLE AND MEASURING DEVICE.
APPLICATION FILED MAR. 16, 1911.
1,005,130.
Patented Oct. 10, 1911.
4 SHEETS—SHEET 3.
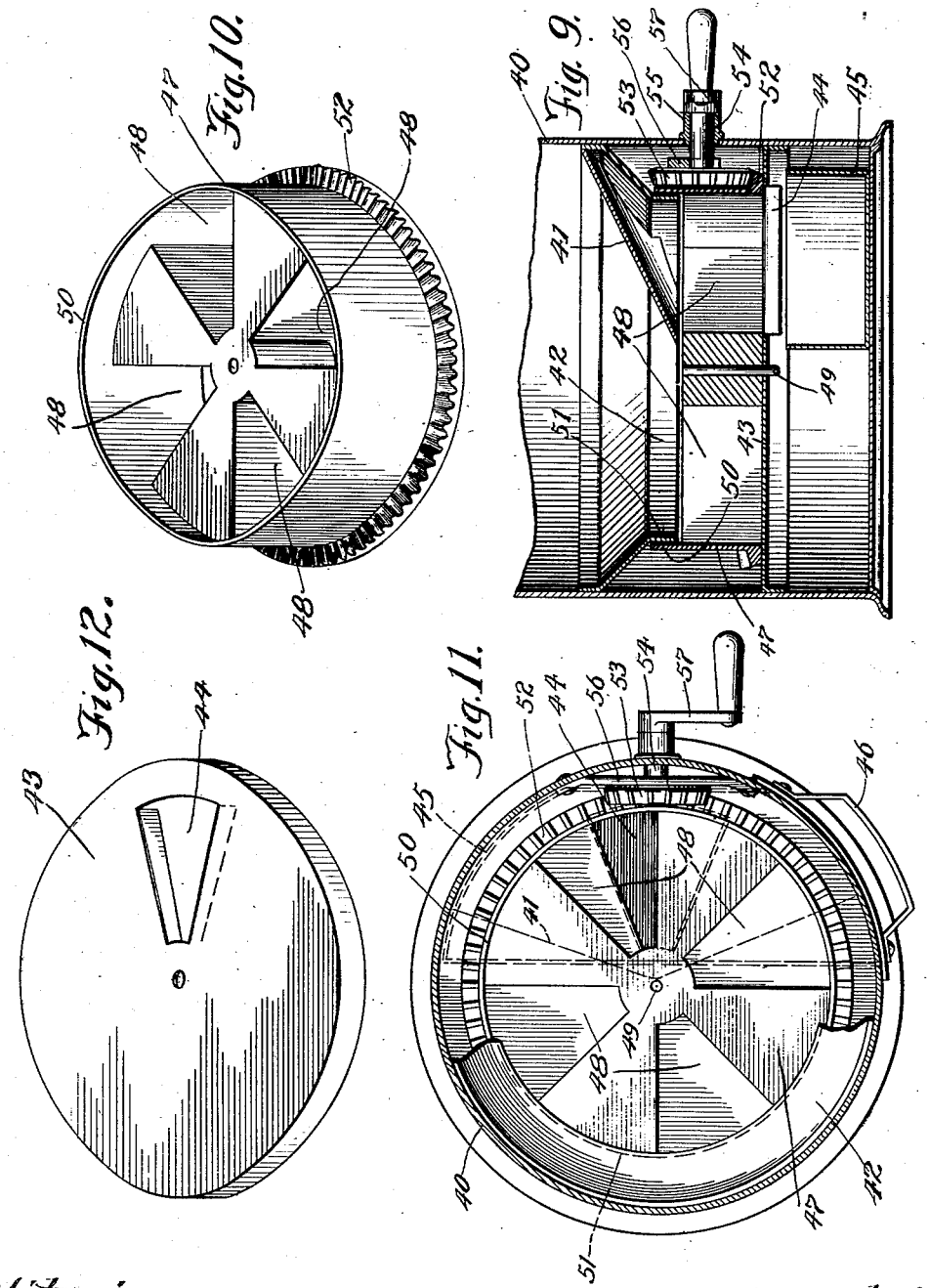

L. ANDREWS.
COMBINED RECEPTACLE AND MEASURING DEVICE.
APPLICATION FILED MAR. 16, 1911.
1,005,130.
Patented Oct. 10, 1911.
4 SHEETS—SHEET 4.
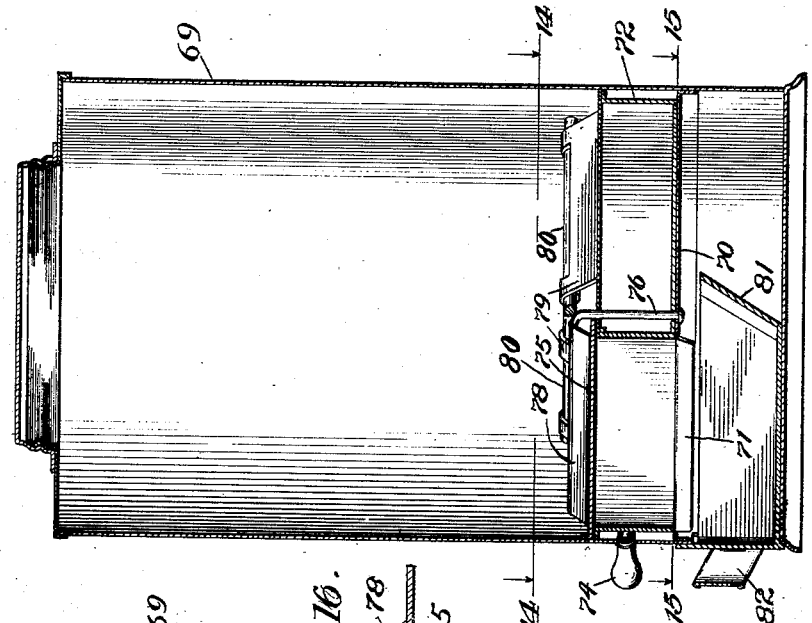
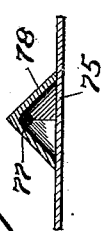
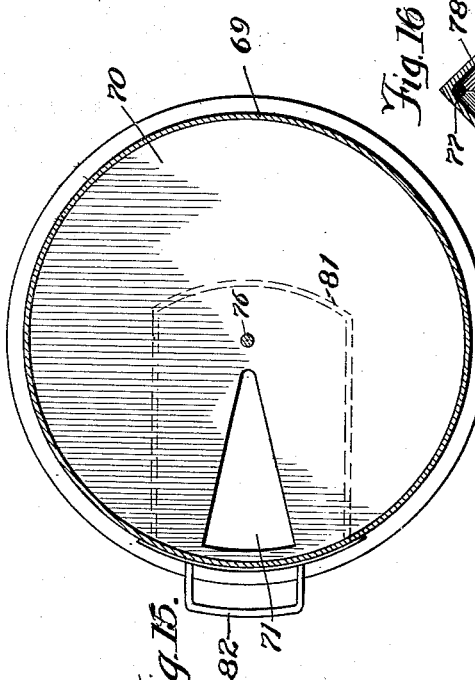
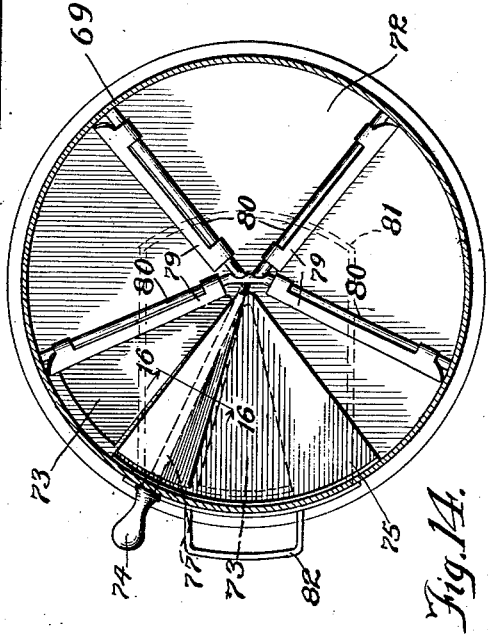

UNITED STATES PATENT OFFICE.

LYMAN ANDREWS, OF DUNDEE, ILLINOIS.

COMBINED RECEPTACLE AND MEASURING DEVICE.

1,005,130.  Specification of Letters Patent. Patented Oct. 10, 1911.

Application filed March 16, 1911. Serial No. 614,940.

*To all whom it may concern:*

Be it known that I, LYMAN ANDREWS, a citizen of the United States, residing at Dundee, in the county of Kane and State of Illinois, have invented certain new and useful Improvements in Combined Receptacles and Measuring Devices, of which the following is a specification.

My invention relates to a combined receptacle and discharging or measuring device, and the invention has for a primary object to provide a receptacle with means whereby the contents of the same may be delivered therefrom, preferably in measured quantities, without opening the receptacle. A receptacle of this character may be used for a variety of purposes. For example, it may be used to contain ground coffee in which case, by making the receptacle substantially air tight the coffee may be taken therefrom, preferably in accurately measured quantities, without opening the receptacle or otherwise exposing its contents to the atmosphere.

The invention has for further objects such other new and improved devices, arrangements, and constructions in combined receptacles and measuring devices as will be hereinafter described and claimed.

The invention is illustrated, in certain preferred embodiments, in the accompanying drawings, wherein—

Figure 1 is a vertical sectional elevation of one form of the invention, Fig. 2, a sectional plan taken on line 2—2 of Fig. 1; Fig. 3, a sectional plan taken on line 3—3 of Fig. 1; Fig. 4, a view in perspective of the measuring device shown in the preceding figures; Fig. 5, a fragmentary elevation of the lower part of the receptacle; Fig. 6, a sectional view taken on line 6—6 of Fig. 2; Fig. 7, a fragmentary view of the lower partition or false bottom; Fig. 8, a broken sectional view illustrating the arrangement of the measuring device and associated parts, Fig. 9, a fragmentary sectional elevation illustrating a modified form of the invention; Fig. 10, a view in perspective of the measuring device shown in Fig. 9; Fig. 11, a broken sectional plan of the parts shown in Fig. 9; Fig. 12, a view, in perspective, of the lower partition or false bottom; Fig. 13, a longitudinal sectional view of another modification of the invention; Figs. 14 and 15, sectional plans taken on line 14—14 and 15—15, respectively, of Fig. 13, and Fig. 16, a detail section on line 16—16 of Fig. 14.

Like characters of reference indicate like parts in the several figures of the drawings.

Referring to Figs. 1 to 8 inclusive, 20 designates a can shown as provided with an opening in the top which is closed by a screw cap 21. Across the lower part of the can extends a partition 22 formed with a sectoral opening at one side which is divided so as to constitute two openings, 23, 23, by means of a member 24 formed preferably with the inclined faces 25, the member 24 being in effect a part of the upper partition or false bottom of the can. The portion of the partition designated 22 is preferably formed at the edge of the sectoral opening with the sloping flange 26. Below the partition 22, 23 is another partition or false bottom 27 formed with an opening 28 which is between the openings 23, 23. Below the opening 28 in partition 27 is a drawer 29 shown as provided with a handle 30. Snugly fitted between partition 22, 24 and partition 27 is a circular measuring device 31 (Fig. 4) formed with the openings 32, 32 and provided with a knob 33, the stem of which extends through a slot 34 (Fig. 5) in the receptacle 20. The measuring device 31 has rigidly secured thereto the pivot 35 which turns in a perforation in partition 27, extends above partition 22 and is formed with the horizontally projecting arms 36, 36 and a similar arm 37 arranged between the same. Pivoted on arms 36 are the scrapers 38. A double edged scraper 39 is pivoted on the arm 37 (Figs. 1, 2 and 6). Preferably a wire 35ª is secured to wire 35 so as to wipe across the flat surface of member 24. The wall of the can above partition 24 has an opening in which to set a pane of glass or isinglass 24ª. This enables the user to keep a check on the amount of coffee in the receptacle. The measuring device 31 has an upstanding rim 31ª which fits close around a flange member 31ᵇ secured to the inside of the can.

With the parts arranged as shown and described, when the knob 33 is at one end of its slot 34 one of the openings 32 in the measuring device 31 registers with one of the openings 23 in the upper partition or false bottom, while the other opening 32, which has previously received a charge of the material from the receptacle above, registers with the opening 28 in the lower partition 27 so that the measured quantity of material received in this space is delivered into the drawer 29. When the knob 33 is shifted to the other end of the slot the position of the openings is reversed. In each position and at all intermediate positions the measuring device closes communication between the receptacle and the discharge opening 28 so that the contents of the receptacle are not exposed to the atmosphere. The scrapers 38 operate alternately to carry the material, especially when there is only a little left in the bottom of the can, into the opening 23. Each scraper in moving away from its respective opening tilts up so as to ride over the material. As the range of movement of the scrapers 38 is not enough, in the particular arrangement shown, to cover the entire surface of partition 22, I preferably provide the double edged or double acting scraper 39, the opposite edges of which are caused, by the movement of the measuring device, to be tilted down into the scraping position or up so as to ride over the material as the case may be. The portion of the upper partition designated 24 is scraped by the wire 35ª. The flange 26 on the partition member 22 acts as a scraper against the upper surface of the measuring device 31. The arrangement of the parts throughout is such that the entire contents of the can may be discharged.

Figs. 9 to 12 inclusive show a modified construction. The upper partition in the can or receptacle 40 is in the form of a hopper 41 having an opening 42 in the bottom. The lower partition 43 (Fig. 12) is formed with a discharge opening 44 out of line with the opening 42 of the hopper 41 below which is a drawer 45 provided with a handle 46; and between the hopper 41 and partition 43 is a circular measuring device 47 formed with a plurality of openings 48 extending therethrough. The measuring device is formed with a pivot 49 which turns in a perforation in the partition 43, and also, preferably with a flange 50 which overlaps a flange 51 at the bottom of the hopper 41. The measuring device is preferably turned by means of a rack and pinion mechanism composed of a circular rack 52 formed around the measuring device, and a pinion 53 carried on a shaft 54 mounted in a bearing 55 on the wall of the can and in a bearing provided by the bracket 56 (Fig. 11), the shaft being turned by means of a crank 57. In the preferred construction the pinion 53 is so proportioned with respect to the circular rack 52 and the openings 42, 44 and 48 are so arranged and proportioned that a single revolution of shaft 54, say from a horizontal position of the crank 57 around to the same position, shifts one of the openings 48 into a position under opening 42 and at the same time brings a previously filled opening or measuring recess in the measuring device 47 into register with the discharge opening 44.

In Figs. 13 to 16 inclusive I have shown another modification. Inside the can 69 is a partition 70 substantially like the lower partition in the device shown in Fig. 1 formed with a discharge opening 71. On this partition is supported the measuring device 72 which is practically the same as the measuring device 31 of the first form of the invention, the measuring device being formed with the two central openings 73, 73 spaced apart as shown in Fig. 4. The measuring device is shifted back and forth by a knob 74. Above the measuring device is a flat sectoral partition 75 large enough to cover one of the openings 73 and the space between the openings. The pivot 76 has the horizontal arm 77 to which is secured the scraper 78 which is V-shaped in cross section. Four scrapers 79 are pivoted to rods 80 secured together at the side of the can. The device is substantially like the first form of the invention except that the partition member 22 is eliminated and the device for covering the openings in the measurer is flat instead of being in the form of a ridge. The scrapers 79 which are stationary bear directly on the top of the measuring device. The scraper 78 which is moved when the measuring device is moved cleans the partition 75. The can is provided with a drawer 81 having the handle 82.

While I have shown three forms of my invention, that of Figs. 1 to inclusive being the preferred form, it will be readily understood that other modifications might be devised without departing from the invention. Therefore I do not limit myself to the precise constructions, arrangements and devices shown and described except so far as the same are made specifically limitations on certain of the claims herein.

I claim:

1. The combination with a receptacle provided with an upper partition which has two openings therein and a lower partition having a discharge opening, of a rotatable measuring device arranged between said partitions and formed with two openings arranged so that in each case when one of the same is in communication with one of the openings in the upper partition the other is in communication with said discharge opening.

2. The combination with a receptacle provided with an upper partition which has two openings therein and a lower partition having a discharge opening, of a rotatable measuring device arranged between said partitions and formed with two openings arranged so that in each case when one of the same is in communication with one of the openings in the upper partition the other is in communication with said discharge opening, and a window formed in the side of the receptacle above said partitions.

3. The combination with a receptacle provided with two partitions having openings therein out of line with each other, of a rotatable measuring device having an opening therethrough and adapted to be rotated back and forth so that the opening therethrough is brought into register first with the opening in the upper partition and then with that in the lower partition, and a pivoted scraper arranged above a portion of the upper partition.

4. The combination with a receptacle provided with an upper partition which has two openings therein and a lower partition having a discharge opening, of a rotatable measuring device arranged between said partitions and formed with two openings arranged so that in each case when one of the same is in communication with one of the openings in the upper partition the other is in communication with said discharge opening, and a pair of pivoted scrapers arranged above a portion of the upper partition.

5. The combination with a receptacle provided with an upper partition which has two openings therein and a lower partition having a discharge opening, of a rotatable measuring device arranged between said partitions and formed with two openings arranged so that in each case when one of the same is in communication with one of the openings in the upper partition the other is in communication with said discharge opening, a pair of pivoted scrapers arranged above a portion of the upper partition, and a double-edged pivoted scraper between the previously named scrapers.

6. An article of the character described comprising in combination a can provided with an upper partition formed with two openings and with a ridge between said openings, a lower partition formed with a discharge opening, a rotatable measuring device formed with two openings, a pivot rigidly connected with said measuring device and formed above the upper partition with three horizontal arms, a pair of scrapers pivoted on two of said arms, a double-edged scraper pivoted on the other arm, a drawer slidably arranged in the bottom of the can below said discharge opening, and a knob on said measuring device for manipulating the same, the can being formed with a slot through which the stem of the knob extends.

7. The combination with a receptacle provided with upper and lower partitions formed with openings out of line with each other, of a rotatable measuring device having an opening therethrough and provided with an operating member; said receptacle being formed with a slot through which the operating member projects limiting the movements of rotation of the measuring device so that at opposite limits the said opening in the measuring device registers with the openings in the upper and lower partitions, respectively, and scrapers arranged above the upper partition which are pivoted so that at the movement of the measuring device in one direction they ride over the material on said partition.

8. The combination with a receptacle provided with upper and lower partitions formed with openings out of line with each other, of a rotatable measuring device having an opening therethrough and provided with an operating member, the measuring device being formed with an upstanding rim, and a downwardly projecting flange inside of the receptacle against which the rim on the measuring device bears.

9. The combination with a receptacle provided with upper and lower partitions formed with openings out of line with each other, of a rotatable measuring device having an opening therethrough and provided with an operating member, the upper partition being spaced above the measuring device with the edges thereof at the opening therein bent down so as to bear upon the measuring device, an upstanding rim on the measuring device, and a flange inside the receptacle against which the rim on the measuring device bears.

10. The combination with a receptacle provided with an upper partition which has two openings and a lower partition having a discharge opening, of a rotatable measuring device arranged between said partitions and formed with two openings arranged so that in each case when one of the same is in communication with one of the openings in the upper partition the other is in communication with said discharge opening; an upstanding rim on said measuring device, and a downwardly projecting flange inside the receptacle against which said rim bears.

LYMAN ANDREWS.

Witnesses:
P. H. TRUMAN,
L. A. FALKENBERG.